United States Patent
Bonella et al.

(10) Patent No.: US 6,397,291 B2
(45) Date of Patent: *May 28, 2002

(54) METHOD AND APPARATUS FOR RETRIEVING DATA FROM A DATA STORAGE DEVICE

(75) Inventors: Randy M. Bonella, Portland; Peter D. MacWilliams; Konrad K. Lai, both of Aloha, all of OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/730,876

(22) Filed: Dec. 5, 2000

Related U.S. Application Data

(63) Continuation of application No. 09/046,941, filed on Mar. 23, 1998, now Pat. No. 6,192,459.

(51) Int. Cl.[7] .............................................. G06F 12/00
(52) U.S. Cl. ....................... 711/107; 711/169; 711/168; 711/220
(58) Field of Search .............................. 711/167, 168, 711/169, 220, 118, 3, 5, 203

(56) References Cited

U.S. PATENT DOCUMENTS

| | | | |
|---|---|---|---|
| 5,255,378 A | | 10/1993 | Crawford et al. ............ 711/127 |
| 5,408,626 A | * | 4/1995 | Dixit .......................... 711/220 |
| 5,479,370 A | | 12/1995 | Furuyama et al. .......... 365/189 |
| 5,509,132 A | * | 4/1996 | Matsuda et al. ............... 711/3 |
| 5,521,876 A | | 5/1996 | Hattori et al. ............... 365/221 |
| 5,530,670 A | | 6/1996 | Matsumoto ................. 365/189 |
| 5,588,130 A | * | 12/1996 | Fujishima et al. ........... 711/118 |
| 5,604,884 A | | 2/1997 | Thome et al. ............... 711/167 |
| 5,671,444 A | | 9/1997 | Akkary et al. ................. 710/52 |
| 5,761,695 A | * | 6/1998 | Maeda et al. ................... 711/5 |
| 5,860,093 A | * | 1/1999 | Englin et al. ................ 711/118 |
| 6,014,732 A | * | 1/2000 | Naffziger ..................... 711/203 |
| 6,192,459 B1 | * | 2/2001 | Bonella et al. .............. 711/220 |

FOREIGN PATENT DOCUMENTS

EP          000382910       * 12/1989

OTHER PUBLICATIONS

Horton, "Selecting the right cache architecture for high performance memories", (c) 1995, p. 111–122.*

* cited by examiner

Primary Examiner—Matthew M. Kim
Assistant Examiner—B. R. Peugh
(74) Attorney, Agent, or Firm—Blakely, Sokoloff, Taylor & Zafman LLP

(57) ABSTRACT

A data retrieval system receives a data address identifying data to be retrieved. A portion of the received data address is communicated to a data storage device during a first clock cycle. The system determines a second address portion based on the received data address. The second address portion is communicated to the data storage device during a second clock cycle. Data is then retrieved from the data storage device based on the address portions communicated to the data storage device. The portion of the received data address communicated to the data storage device during the first clock cycle is a set address and the second address portion communicated to the data storage device during the second clock cycle is a way address. A read cycle can be initiated after communicating a portion of the received data address to the data storage device during the first clock cycle.

27 Claims, 3 Drawing Sheets

FIG. 3

| TOTAL CLOCKS | 1 | 2 | 3 | 4 | 5 | 6 | 7 | 8 |
|---|---|---|---|---|---|---|---|---|
| MEMORY COUNT | 1 | 2 | 1 | 2 | 3 | 1 | 1 | 1 |
| | TAG ACCESS | TAG SET ADDR | ADSC# WAY ADDR VALID | SRAM ACCESS | DATA 1 VALID | DATA 2 VALID | DATA 3 VALID | DATA 4 VALID |

FIG. 4

| TOTAL CLOCKS | 1 | 2 | 3 | 4 | 5 | 6 | 7 | 8 | 9 |
|---|---|---|---|---|---|---|---|---|---|
| MEMORY COUNT | 1 | 2 | 1 | 2 | 3 | 4 | 1 | 1 | 1 |
| | TAG ACCESS | TAG SET ADDR VALID | ADSC# WAY ADDR VALID | SRAM ACCESS | SRAM ACCESS | DATA 1 VALID | DATA 2 VALID | DATA 3 VALID | DATA 4 VALID |

FIG. 5

| TOTAL CLOCKS | 1 | 2 | 3 | 4 | 5 | 6 | 7 | 8 |
|---|---|---|---|---|---|---|---|---|
| MEMORY COUNT | 1 | 1 | 2 | 3 | 4 | 1 | 1 | 1 |
| | TAG ACCESS | ADSC# WAY ADDR VALID | SRAM ACCESS WAY ADDR | SRAM ACCESS | DATA 1 VALID | DATA 2 VALID | DATA 3 VALID | DATA 4 VALID |

METHOD AND APPARATUS FOR RETRIEVING DATA FROM A DATA STORAGE DEVICE

This application is a continuation of Application Ser. No. 09/046,941, filed Mar. 23, 1998 now U.S. Pat. No. 6,192,459, and claims priority thereto.

FIELD OF THE INVENTION

The present invention relates to a data retrieval system. More specifically, the invention provides a system for retrieving data from a data storage device by providing different portions of the data address during different clock cycles.

BACKGROUND

Various cache memory systems are known that retrieve data from a data storage device using a tag memory. The data storage device stores data that may be requested by a central processing unit (CPU) or other processing device. The tag memory stores the addresses of the data contained in the data storage device. Additionally, comparison logic or a controller is used to determine whether a particular address is contained in the data storage device by analyzing the information stored in the tag memory.

Different types of mapping methods may be used in a cache memory system, such as direct mapping, fully associative mapping, and set-associative mapping. In direct-mapped cache memory, each location at a data source can be mapped to a single, unique location in the cache memory. In a fully associative cache memory, each location at a data source may be mapped to any location in the cache memory. In a set-associative mapping, the cache memory is divided into a number of "ways", each way having a predetermined number of entries. A location at a data source may be mapped to any one entry of a "set" of entries, each entry of the set being located in a different way. For example, in a 4-way, set-associative cache memory, a location X at the data source may be mapped to the Mth entry of any one of ways 0, 1, 2, or 3, depending on availability.

As processing requirements increase, clock frequencies in various types of data processing systems also increase. Increased clock frequencies result in shorter time periods for each clock cycle. Thus, an activity or procedure that was previously performed in one clock cycle may require two or more clock cycles to complete if the clock frequency is increased significantly. To maintain a single clock cycle execution time, the affected device may select a newer manufacturing process technology that provides faster execution (e.g., faster data access from a memory array). However, newer manufacturing process technologies may be expensive to implement.

It is therefore desirable to provide a system that allows for increased clock frequencies while maintaining the same number of execution cycles and using the same manufacturing process technology.

SUMMARY OF THE INVENTION

Embodiments of the present invention provide a data retrieval system that receives a data address identifying data to be retrieved. A portion of the received data address is communicated to a data storage device during a first clock cycle. The system determines a second address portion based on the received data address. The second address portion is communicated to the data storage device during a second clock cycle. Data is then retrieved from the data storage device.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 3 illustrates an embodiment of a sequence of steps for retrieving data from a data storage device.

FIG. 4 illustrates another embodiment of a sequence of steps for retrieving data from a data storage device.

FIG. 5 illustrates an embodiment of a sequence of steps for retrieving data from a data storage device using late way addressing.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

The present invention is related to a system that reduces the time necessary to retrieve data from a data storage device by providing different portions of the data address during different clock cycles. The present invention allows the same manufacturing process technology to be used in combination with higher clock frequencies, while maintaining the same number of clock cycles to complete the operation (e.g., retrieve data from a data storage device).

Figure 1:
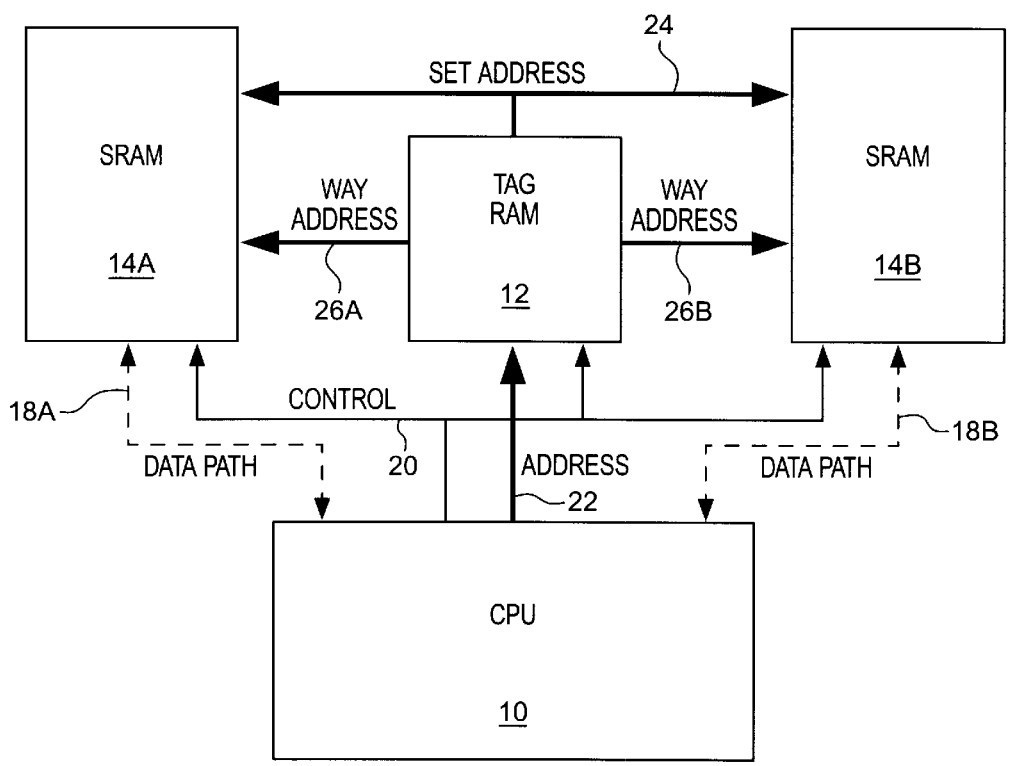
FIG. 1 illustrates an embodiment of an environment in which the present invention may be used.

FIG. 1 illustrates an embodiment of an environment in which the present invention may be used. A central processing unit (CPU) 10 performs various data processing and data handling operations. As part of its regular operation, CPU 10 receives data from one or more sources, processes data, and stores or transfers data to one or more destinations. CPU 10 may exchange data with additional devices not shown in FIG. 1, such as printers, mass storage devices, input/output interfaces, and various other data storage devices.

CPU 10 is coupled to a TAG RAM 12, which is capable of handling and controlling a pair of data storage devices 14a and 14b. In the embodiment of FIG. 1, data storage devices 14a and 14b are Static Random Access Memories (SRAMs). Although data storage devices 14a and 14b are illustrated as two separate devices, they may be treated as a single logical device (referred to herein as device 14). For example, in the embodiment of FIG. 1, data storage devices 14a and 14b are 32-bit SRAMs coupled to a 64-bit data bus. Thus, two 32-bit SRAMs are required to provide 64 bits of data on the data bus. In alternate embodiments, a single 64-bit SRAM or four 16-bit SRAMs may be used to provide 64 bits of data. In other embodiments of the invention, data storage devices 14a and 14b can be any type of data storage device, such as a disk drive or other type of memory device.

TAG RAM 12 stores address information regarding data elements stored in SRAM 14. TAG RAM 12 includes a memory controller for controlling access to SRAM 14 and a tag lookup mechanism to determine whether a particular address is stored in SRAM 14. Although TAG RAM 12 is shown as a single device in FIG. 1, alternate embodiments of the invention may implement TAG RAM 12 using a separate tag lookup mechanism and a separate memory controller to perform the operations discussed below.

TAG RAM 12 is coupled to CPU 10 through a control bus 20 and an address bus 22. Control bus 20 is also coupled to SRAM 14. Control bus 20 communicates control signals from CPU 10 to TAG RAM 12 and SRAM 14. These control signals may include chip enable signals, output enable signals, and clock signals. FIG. 1 illustrates two data paths 18a and 18b coupled between CPU 10 and SRAMs 14a and 14b. Data paths 18a and 18b may be treated as a single logical data path or data bus (referred to herein as data path 18). TAG RAM 12 is coupled to SRAM 14 using both a set address bus 24 and a pair of way address communication links 26a and 26b. Way address communication links 26a and 26b can be two separate communication links, as shown in FIG. 1, or a single address bus coupled between TAG RAM 12 and SRAM 14.

As mentioned above, in other embodiments of the invention, any number of data storage devices can be coupled to TAG RAM 12 and CPU 10. In a specific embodiment of the invention, SRAM 14 shown in FIG. 1 is a pipelined burst SRAM capable of sequentially bursting four data elements onto data path 18 in response to a single data read operation.

In operation, CPU 10 generates a data request by providing a data address to TAG RAM 12 on address bus 22. TAG RAM 12 determines whether the data associated with the data address is stored in SRAM 14. If the requested data is not stored in SRAM 14 (i.e., the data address is not stored in TAG RAM 12), then CPU 10 must retrieve the data from another source, such as a main memory (not shown). Otherwise, the requested data is retrieved from SRAM 14 and provided to CPU 10 on data path 18. Additional details regarding the operation of TAG RAM 12 and SRAM 14 are provided below.

Figure 2:
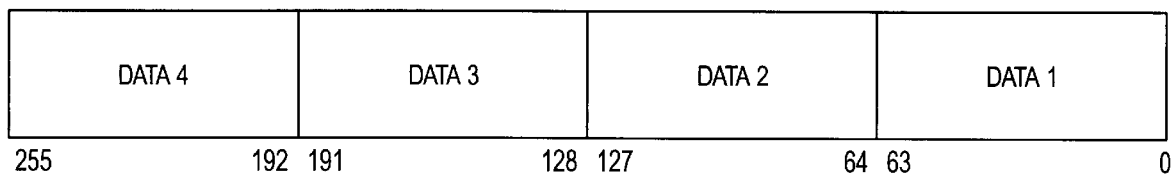
FIG. 2 illustrates an embodiment of a line of data as stored in a data storage device.

FIG. 2 illustrates an embodiment of a line of data as stored in a data storage device. The line of data illustrated in FIG. 2 contains four data elements, labeled Data 1, Data 2, Data 3, and Data 4. In this example, each data element is a 64-bit word, such that the entire line of data contains 256 bits of data. In alternate embodiments, a particular line of data may contain any number of bits, and be subdivided into any number of data elements. A particular data retrieval operation, as discussed below, retrieves four consecutive data elements from a particular data line. In the example of FIG. 2, data elements Data 1–Data 4 are retrieved consecutively (i.e., in consecutive clock cycles) from the data line.

FIG. 3 illustrates an embodiment of a sequence of steps for retrieving data from a data storage device, such as SRAM 14 shown in FIG. 1. The sequence shown in FIG. 3 illustrates eight consecutive clock cycles, numbered 1–8. The overall access time associated with the sequence shown in FIG. 3 is referred to as "5-1-1-1". The "5" indicates that it takes five clock cycles to retrieve the first data element from the data storage device. Each subsequent "1" indicates the number of clock cycles required to retrieve subsequent data elements from the data storage device. Therefore, "5-1-1-1" indicates that the system requires five clock cycles to retrieve the first data element from the data storage device and one clock cycle to retrieve each subsequent data element.

In the sequence of FIG. 3, during the first clock cycle, a tag access is initiated. During the second clock cycle, the tag access continues, and the set address becomes valid. During the third clock cycle, a read operation is initiated. In the example of FIG. 3, the read operation is initiated by asserting an ADSC# signal. Additionally, the way address becomes valid during the third clock cycle. Thus, at the end of clock cycle 3, both the set address and the way address are valid, thereby allowing data to be retrieved from the data storage device.

In clock cycle 4, the memory device access begins (in this example, the memory device is an SRAM). During clock cycle 5, the first data element (Data 1) becomes valid, such that the data element may be provided to the CPU on a data path, such as a data bus. Typically, the data element is communicated to the CPU during the next clock cycle. During clock cycles 6, 7, and 8, data elements Data 2, Data 3, and Data 4 become valid and available for communication to the CPU across the data path.

As shown in FIG. 3, the entire data access (from initial tag access until all four data elements are valid) requires 8 clock cycles. The first data becomes valid in clock cycle 5, and the remaining three data elements become valid in each subsequent clock cycle, thereby providing an overall access of 5-1-1-1. The read cycle sequence is referred to as a 3-1-1-1 sequence because the actual read sequence is not initiated until the third clock cycle. Thus, the latency to retrieve the first data element is three clock cycles (i.e., clock cycles 3, 4, and 5). Thereafter, an additional data element becomes valid in each subsequent clock cycle.

FIG. 4 illustrates another embodiment of a sequence of steps for retrieving data from a data storage device. The sequence of FIG. 4 is implemented in a system operating at a higher clock frequency than the system used with the sequence of FIG. 3. Since the clock frequency is higher, the time period of each clock cycle is shorter. The manufacturing process technology used to manufacture a particular memory device (e.g., SRAM) requires a specified amount of time to retrieve information from the device. Thus, as the time period of each clock cycle is reduced, certain memory device operations may require an additional clock cycle to complete. Thus, although the sequences of FIG. 3 and FIG. 4 both retrieve four data elements, the sequence of FIG. 4 requires an additional clock cycle to complete the retrieval due to the shortened clock cycle periods.

The sequence of FIG. 4 requires nine clock cycles to retrieve four data elements (Data 1–Data 4). The sequence has an overall access of 6-1-1-1 and a read access of 4-1-1-1. Thus, the sequence shown in FIG. 4 takes an extra clock cycle to perform the same operation as that illustrated above in FIG. 3. The extra clock cycle is contained in clock cycle 5. In FIG. 3, only a single SRAM access cycle was required, but FIG. 4 requires two SRAM access cycles due to the higher clock frequency (and reduced clock cycle time period), as discussed above. Although the sequence of FIG. 4 requires an additional clock cycle to complete, the overall performance of the system is increased due to the higher clock frequency. Additionally, this increased performance is achieved using the same manufacturing process technology. Thus, a slower manufacturing technology can be used to minimize manufacturing costs of the memory device while overall performance is increased by increasing the clock frequency.

FIG. 5 illustrates an embodiment of a sequence of steps for retrieving data from a data storage device using late way addressing (also referred to as early row addressing). The sequence of steps illustrated in FIG. 5 are performed at a higher clock frequency, as discussed above with respect to the sequence of FIG. 4. However, the sequence shown in FIG. 5 is able to retrieve four data elements in eight clock cycles, instead of nine clock cycles as required by the sequence of FIG. 4. Thus, the sequence of FIG. 5, using a higher clock frequency, is able to retrieve four data elements in the same number of clock cycles as required by the sequence of FIG. 3 (which uses a slower clock frequency).

As shown in FIG. 5, the SRAM access procedure requires two clock cycles (i.e., clock cycles 3 and 4). However, the read initiation signal (ADSC#) occurs in clock cycle 2 rather than clock cycle 3. This early assertion of the read initiation signal allows the entire sequence to complete in eight clock cycles, rather than nine (as required by the sequence in FIG. 4). In clock cycle 2, the read access is initiated when only the set address is valid (i.e., the way address is not yet valid). Thus, in clock cycle 3, the SRAM access continues while, at the same time, the way address becomes valid. This process is referred to as late way addressing or early row addressing.

Late way addressing is permitted because the set address is available directly from the address received from the CPU. In one embodiment of the invention, the set address includes all bits in the address received from the CPU except the two most significant bits. Thus, all address bits except the two most significant bits pass through the TAG RAM to the data storage device being accessed. In an embodiment of the invention, the time required to identify the data elements associated with the set address is longer than the time required to identify the data elements associated with the way JIN address. In this embodiment, the way address is associated with the particular memory bank and is identified quickly when compared to the time required to identify the row and column addresses (associated with the set address). Therefore, the memory device starts the identification of the data elements using just the set address, and the way address is provided during the next clock cycle. Since the way address information can be processed quickly by the SRAM, and is not needed until the next clock cycle, the use of late way addressing reduces the number of cycles required to retrieve data without disrupting the data retrieval process.

Figure 6:
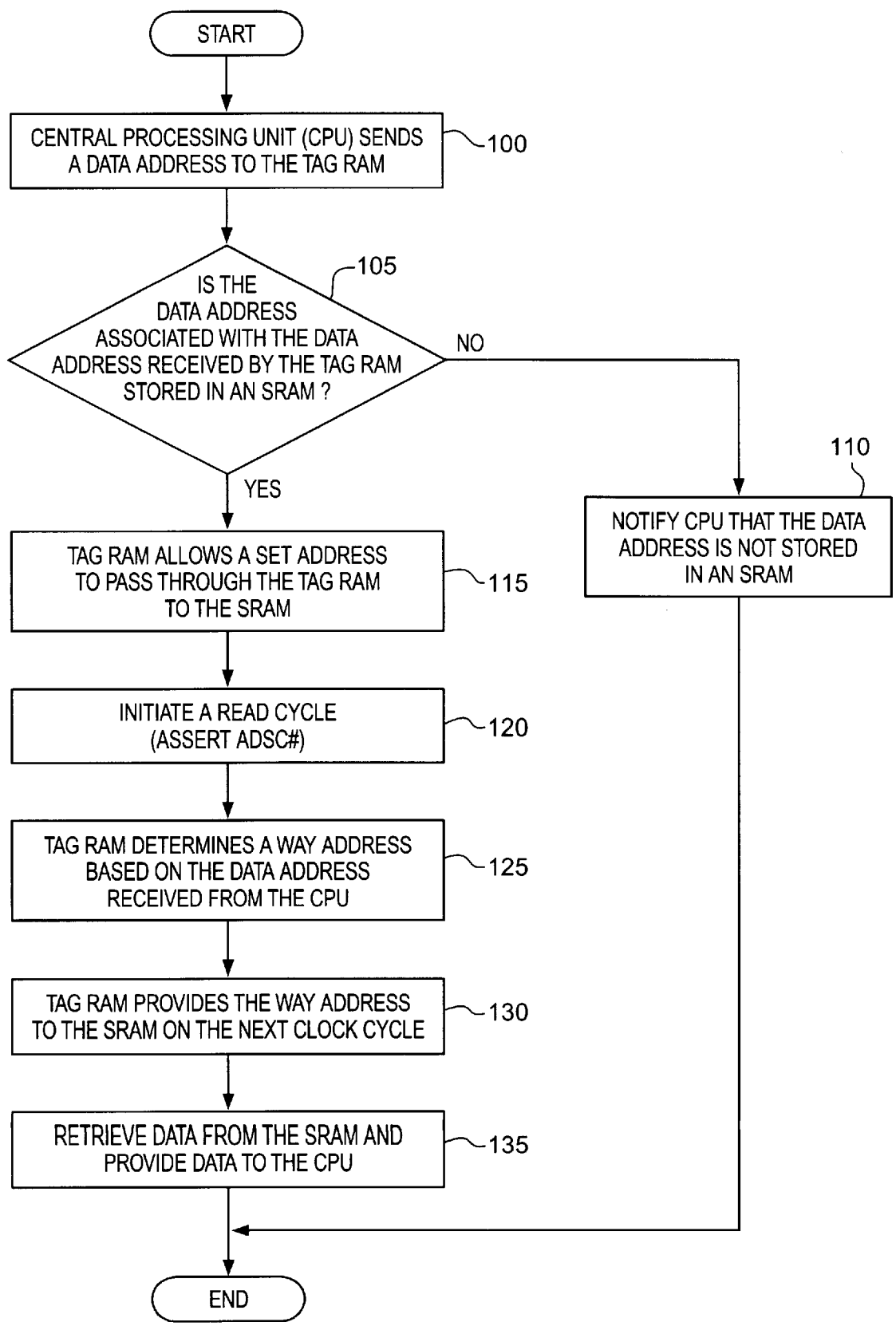
FIG. 6 is a flow diagram illustrating an embodiment of a procedure for retrieving data from a data storage device.

FIG. 6 is a flow diagram illustrating an embodiment of a procedure for retrieving data from a data storage device using late way addressing, as discussed above. At step 100, the CPU sends a data address to the TAG RAM. This data address provided by the CPU identifies a particular line of data or set of data to be retrieved from the data storage device. At step 105, the procedure determines whether the data address received by the TAG RAM is stored in the SRAM. If the data associated with data address is not stored in the SRAM, then the procedure branches to step 110 to notify the CPU that the data address is not stored in the SRAM. Alternatively, step 110 may notify a memory controller or similar device that the data address is not stored in the SRAM. At this point, the CPU (or other device) may retrieve the desired data from another data storage device, such as a main memory. The procedure then terminates without retrieving any data from the SRAM.

If the data address received by the TAG RAM is stored in the SRAM, then the procedure continues from step 105 to step 115, where the TAG RAM allows a set address to pass through the TAG RAM to the SRAM. As discussed above, the set address may represent a portion of the data address received from the CPU. At step 120, a read cycle is initiated by the TAG RAM (e.g., by asserting the ADSC# signal). At this point, the SRAM begins accessing the requested data based on the set address alone. At step 125, the TAG RAM determines a way address based on the data address received from the CPU. Thus, this second address portion (i.e., the way portion), used by the SRAM to identify the appropriate data, is determined after the read cycle has been initiated.

At step 130, the TAG RAM provides the way address to the SRAM during the next clock cycle. Step 135 retrieves data from the SRAM and provides the data to the CPU. For example, step 135 may retrieve four data elements (e.g., Data 1–Data 4 shown in FIG. 2) and provide the data elements to the CPU in the next consecutive clock cycles (i.e., one data element each clock cycle). The data retrieval performed in step 135 retrieves data based on both the set address provided to the SRAM in step 115 and the way address provided to the SRAM in step 130.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A memory system comprising:
   a tag ram comprising a memory controller and a tag ram lookup mechanism;
   a first connection coupled to a control bus through which data retrieval requests are sent;
   a data storage device comprising ways and sets;
   a set address bus coupled to the tag ram and the data storage device;
   way address links coupled to the tag ram and the data storage device;
   the tag ram to (i) receive a data retrieval request through the first connection in a first clock cycle, (ii) transmit a set address portion of the data retrieval request to the data storage device through the set address bus in a second clock cycle, (iii) look up way address information in the tag ram lookup mechanism in the second clock cycle based on the data retrieval request, (iv) transmitting the way address to the data storage device in a third clock cycle, (v) retrieve data associated with the data retrieval request, and (vi) initiate a read operation of the data associated with the data retrieval.

2. The memory system of claim 1, wherein the tag ram initiates the read operation by asserting an ADSC# signal.

3. A method of operating a memory system comprising:
   receiving a data retrieval request through a connection with a control bus in a first clock cycle by a tag ram, the tag ram comprising a memory controller and a tag lookup mechanism;
   transmitting a set address portion of the data retrieval request to a data storage device through a set address bus by a tag ram, the set address bus coupled to the tag ram and the data storage device, and the data storage device comprising sets and ways;
   looking up way address information in the tag lookup mechanism in a second clock cycle by the tag ram;
   transmitting the way address to the data storage device in a third clock cycle by the tag ram; and
   retrieving the data associated with the data retrieval request by the tag ram.

4. The method of claim 3, further comprising:
   initiating a read operation of the data associated with the data retrieval request in the second clock cycle by the tag ram.

5. The method of claim 3, wherein the data storage device comprises static random access memory.

6. The method of claim 3, wherein the data storage device comprises pipelined burst static random access memory.

7. The method of claim 3, further comprising:
determining whether the data associated with the data retrieval request is contained in the data storage device by the tag ram.

8. The method of claim 3, wherein,
the third clock cycle is subsequent to the second clock cycle, and the second clock cycle is subsequent to the first clock cycle.

9. A method of comprising:
a. receiving a data address identifying data to be retrieved;
b. communicating a set address portion of the data address to a data storage device over a set address bus during a first clock cycle;
c. determining a way address based on the data address;
d. communicating the way address to the data storage device over way address links during a second clock cycle; and
e. retrieving data from the data storage device.

10. The method of claim 9 wherein said retrieving data from the data storage device is based on the set and way addresses.

11. The method of claim 9, wherein the second clock cycle is subsequent to the first clock cycle.

12. The method of claim 9, further comprising determining whether the data associated with the data address is contained in the data storage device.

13. The method of claim 9, further comprising initiating a read cycle after said communicating the set address to the data storage device over the set address bus during the first clock cycle, but before said communicating the way address to the data storage device during the second clock cycle.

14. The method of claim 9 wherein the data storage device comprises static random access memory.

15. The method of claim 9, wherein the data storage device comprises pipelined burst static random access memory.

16. A data processing apparatus comprising:
a processing device;
a set address bus;
way address links;
a data storage device coupled to the processing device by both the set address bus and the way address links; and
a data retrieval control device coupled to the processing device and the data storage device, wherein the data retrieval control device is configured to:
receive a data address identifying data to be retrieved from the data storage device;
communicate a set address portion of the received data address portion of the data address to the data storage device during a first clock cycle;
determine a way address based on the data address;
communicate the way address to the data storage device during a second clock cycle; and
retrieve the data from the data storage device.

17. The data processing apparatus of claim 16, wherein the data retrieval control device retrieves data from the data storage device based on the set and way address communicated to the data storage device during the first clock cycle and the second clock cycle, respectively.

18. The data processing apparatus of claim 16, wherein the second clock cycle is subsequent to the first clock cycle.

19. The data processing apparatus of claim 16, wherein the data retrieval control device is further configured to determine whether the data associated with the data address is contained in the data storage device.

20. The data processing apparatus of claim 16, wherein the data retrieval control device is further configured to initiate a read cycle after communicating the set address to the data storage device during the first clock cycle, but before communicating the way address to the data storage device during the second clock cycle.

21. The data processing apparatus of claim 16 wherein the data storage device comprises static random access memory.

22. The data processing apparatus of claim 16, wherein the data storage device comprises pipelined burst static random access memory.

23. A data retrieval apparatus comprising:
means for receiving a data address identifying data to be retrieved;
first communication means for communicating a first address portion of the data address to a data storage device during a first clock cycle;
means for determining a second address portion based on the data address;
second communication means for communicating the second address portion to the data storage device during a second clock cycle; and
means for retrieving data from the data storage device.

24. The data retrieval apparatus of claim 23, wherein the second clock cycle is subsequent to the first clock cycle.

25. The data retrieval apparatus of claim 23, further including means for determining whether the data associated with the data address is contained in the data storage device.

26. The data retrieval apparatus of claim 23, further including means for initiating a read cycle after the first communication means has communicated the first address portion to the data storage.

27. A SRAM comprising:
a plurality of data storage registers configured as a plurality of ways, the ways comprising a plurality of sets;
a first connection for coupling with a set address bus;
a second connection for coupling with way address links; and
the SRAM configured to receive a set address of a desired set of data through the first connection in a first clock cycle and to identify sets of the plurality of sets within each of the plurality of ways, receive a way address of the desired set of data through the second connection in a second clock cycle to identify the way of the plurality of ways in which the desired set of data is stored.

* * * * *

UNITED STATES PATENT AND TRADEMARK OFFICE
CERTIFICATE OF CORRECTION

PATENT NO.    : 6,397,291 B2
DATED         : May 28, 2002
INVENTOR(S)   : Bonella et al.

It is certified that error appears in the above-identified patent and that said Letters Patent is hereby corrected as shown below:

Column 5,
Line 31, delete "JIN".
Line 50, delete "with data address" and insert -- with the data address --.

Signed and Sealed this

Twelfth Day of November, 2002

*Attest:*

*Attesting Officer*

JAMES E. ROGAN
*Director of the United States Patent and Trademark Office*